United States Patent [19]
Van Alsburg

[11] 3,813,972
[45] June 4, 1974

[54] CUTTING MEANS
[75] Inventor: Earl Roger Van Alsburg, Barrington, Ill.
[73] Assignee: American Can Company, Greenwich, Conn.
[22] Filed: Jan. 4, 1973
[21] Appl. No.: 320,898

[52] U.S. Cl.............................. 82/82, 82/85, 82/92, 82/97, 82/101
[51] Int. Cl............................................. B23b 5/14
[58] Field of Search .............. 82/82, 85, 92, 97, 101

[56] References Cited
UNITED STATES PATENTS
2,695,582  11/1954  Johnson ........................... 83/105 X
3,086,509  4/1963  Henley ............................... 82/82 X
3,534,644  10/1970  Germiat et al .......................... 84/82

Primary Examiner—Leonidas Vlachos
Attorney, Agent, or Firm—Robert P. Auber; Paul R. Audet; Harries A. Mumma, Jr.

[57] ABSTRACT

Improved cutting means for an inside-out tube cutting apparatus, including a plurality of small, free-wheeling cutter wheels eccentrically mounted in the surface of, and each having its axis parallel to that of, its mandrel. Preferably, the wheels are pin-mounted in a longitudinal groove in the surface of the mandrel.

7 Claims, 4 Drawing Figures

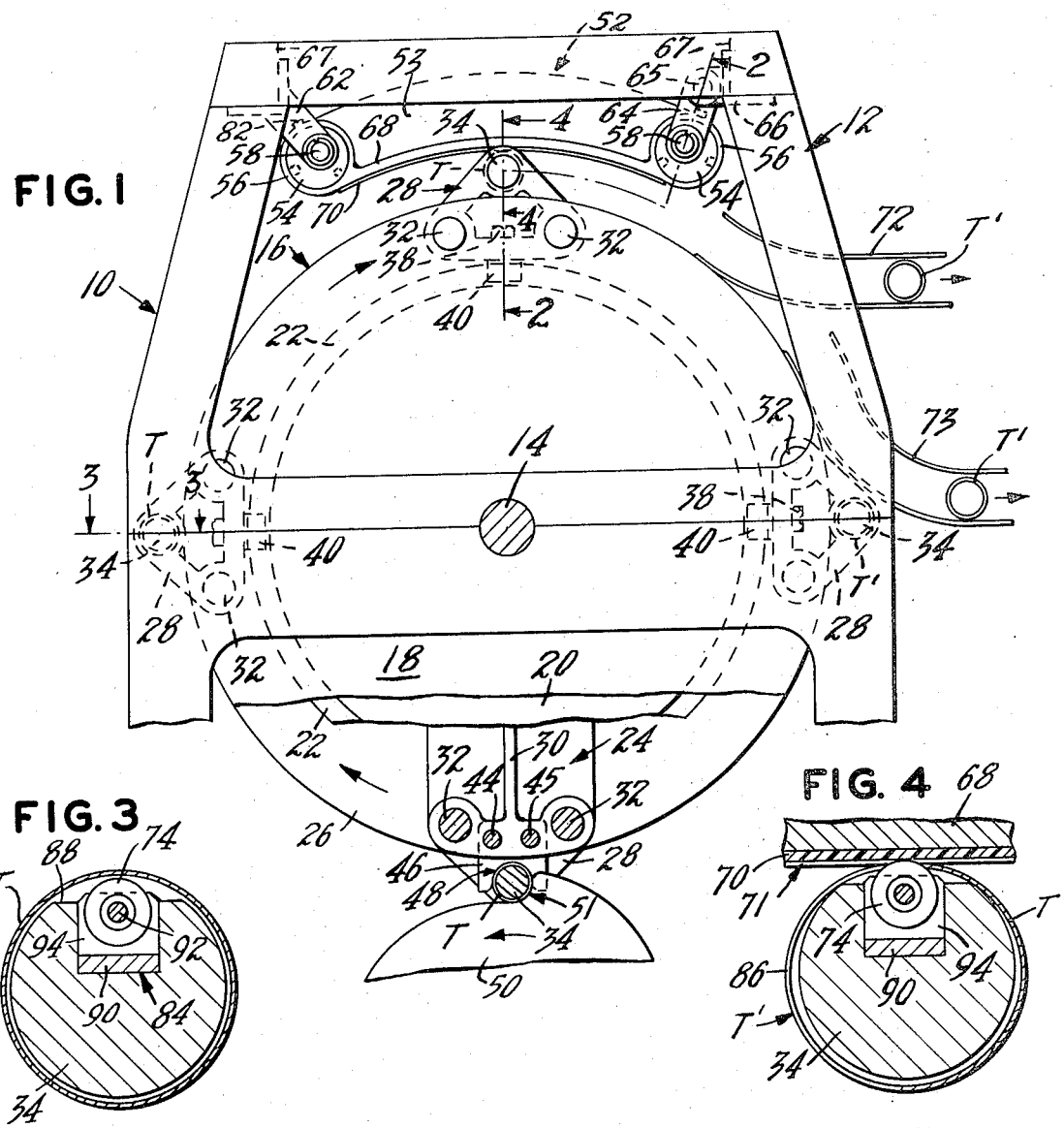
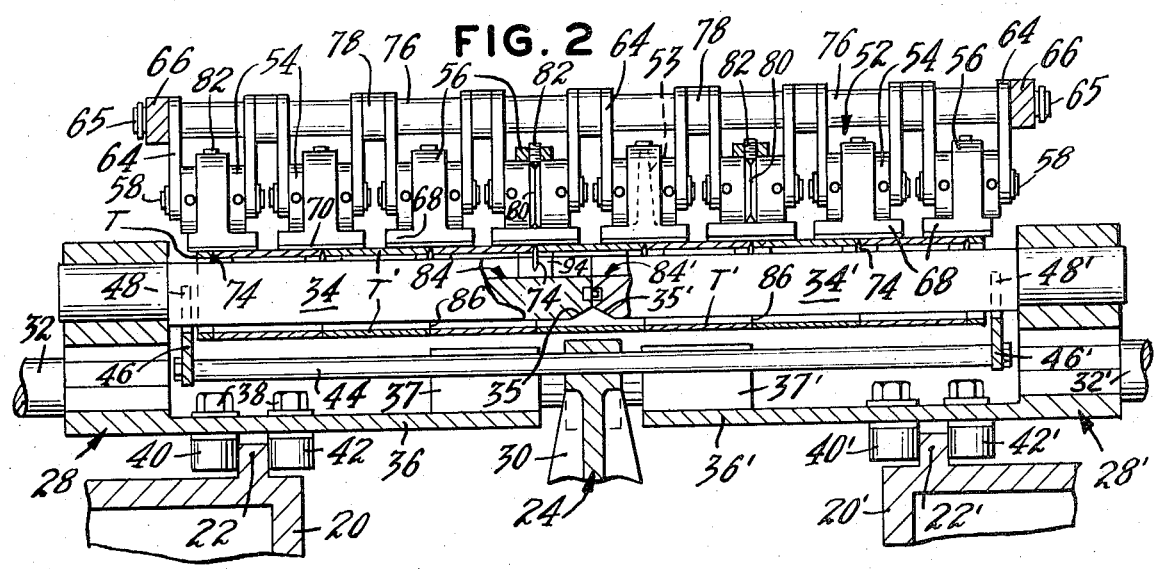

CUTTING MEANS

BACKGROUND OF THE INVENTION

This invention relates to an apparatus for cutting a tube into a plurality of tubular segments, and has particular reference to an improved cutting means for such an apparatus which effects the cutting from the inside rather than from the outside of the tube.

In the art of manufacturing a plurality of tubular bodies, practically endless lengths of elongated tubes are formed by helically winding onto a suitable mandrel a plurality of ribbons of sheet material made of paper, plastic, foil or the like, in manner that the successive layers of ribbons have either butt joints or overlapping joints between their convolutions. The layers are often superimposed upon each other with suitable adhesives therebetween and with the joints between the successive convolutions of one layer out of alignment with those of the next layer so that a rigid tubular structure is built. Often, the ribbon of sheet material that forms the outer layer has unitary label patterns printed thereon so that each tubular body cut from the elongated endless length will already be labeled. As an endless length of tubing is passed from a spiral winding machine it is cut into sticks, herein called tubes, of, for example, 3 to 4 feet in length for convenience of handling. The sticks or tubes are subsequently cut into individual tubular segments such as for forming individual fiber container bodies.

The machinery for cutting the tubes into tubular segments is known. Usually, the cutting is effected from the outside of the tube. However, for forming containers that, for example, have a metal container end closure double seamed to each of its respective ends, especially those for packaging food products, exterior cutting is not suitable since such cutting forms burrs on the inside of the ends of the can and prevents hermetic seals from being obtained.

In the manufacture of tubular segments for making containers especially for food and beverage products, it is desirable to cut from the inside-out to form the burr or flange on the outside of the can. This facilitates double seaming the end closures thereon and allows hermetic seals to be obtained. Although inside-out cutting has been heretofore effected, it has been difficult to obtain clean, even cuts around the entire circumference of the tubes. Uneven cuts cause exterior labels to be out of register, and often slivers of fiber material which are formed sometimes drop into the container and become dispersed in the packaged product. Uneven cuts are formed because the cutting means are unsteady. Usually they are difficult to examine, adjust, repair and replace.

It is an object of this invention to overcome the aforementioned and other shortcomings.

Another object of this invention is to provide improved cutting means for an inside-out tube cutting apparatus which provide clean, even cuts around the entire circumference of the cut tubular segments.

Another object of this invention is to provide improved cutting means including a plurality of spaced small free-wheeling cutter wheels mounted in the circumference of a mandrel of an inside-out tube cutting apparatus.

Another object of this invention is to provide improved cutting means on a mandrel of an inside-out tube cutting apparatus which facilitates the making of individual cut adjustments.

Another object of this invention is to provide improved cutting means on the mandrel of an inside-out tube cutting apparatus which facilitates examination, adjustment, repair and replacement of the cutting means.

These and other objects of the invention will be apparent as it is better understood from the description which follows, which, taken in connection with the drawing discloses a preferred embodiment thereof.

BRIEF SUMMARY OF THE INVENTION

This invention is an improved cutting means for an inside-out tube cutting apparatus of the type including a mandrel for carrying the tube, cutting means for cutting the tube from the inside-out into a plurality of segments, means for moving the tube into working relationship with the cutting means, and means for discharging the tubular segments. The improvement comprises a plurality of free-wheeling cutter wheels of smaller circumference than, and mounted in, the mandrel so that the axis of each cutter wheel is parallel and eccentric to that of the mandrel, and so that each cutter wheel has its circumferential cutting edge preferably inside the circumference of the mandrel and exposed to the tube by a flattened mandrel surface; and backing means abuttingly engaging the surface of the tube preferably to distort the tube as allowed by the flattened mandrel surface, and to force the tube to rotate against the cutter wheels and thereby cut it into a plurality of tubular segments. The preferred flattened surface exists on the mandrel along a longitudinal secantial plane thereof substantially parallel to its axis. Preferably, a longitudinal groove exists in the flattened surface and runs parallel to the mandrel axis, there are a plurality of substantially U-shaped blocks mounted in the groove, the cutter wheels are pin-mounted in the tines of the blocks; and the backing means include a plurality of individual backing members respectively aligned with the cutter wheels and perpendicularly adjustable in relation to the axis of the respective wheels and adapted to abuttingly engage and apply variable pressure to the exterior surface of the tube during the cutting operation.

BRIEF DESCRIPTION OF THE DRAWINGS

FIG. 1 is a fragmentary front view of a portion of an inside-out tube cutting apparatus having the improved cutting means of this invention.

FIG. 2 is an enlarged cross section showing the cutting means of this invention as taken substantially along line 2—2 of FIG. 1.

FIG. 3 is an enlarged cross section of a tube on a mandrel taken substantially along line 3—3 of FIG. 1.

FIG. 4 is an enlarged cross section of a tube being cut on a mandrel as taken substantially along line 4—4 of FIG. 1.

DETAILED DESCRIPTION OF THE INVENTION

Considering the drawings in detail, FIG. 1 is a preferred embodiment of the invention including an insideout tube cutting apparatus generally designated 10, having a frame generally designated 12 within which is mounted a drive shaft 14 driven to rotate in a clockwise direction by suitable drive means (not shown). Fixedly mounted on drive shaft 14 is main turret generally designated 16 having partly broken away front plate 18, barrel cam 20 having barrel cam track 22, star wheel 24 and rear plate 26. Shown at approximately the 12, 3, 6 and 9 o'clock positions on main turret 16 are a plurality of slide members 28 affixed to front and rear turret plates 18, 26 by pairs of slide rods 32 whose longitudinal axes are substantially parallel to that of drive shaft 14. Fixedly mounted to slide members 28 are mandrels 34 whose longitudinal axes also are substantially parallel to that of drive shaft 14. Slide members 28 have extensions 36 mounted by bolts 38 to cam rollers 40, 42 which carry slide members 28 and their mandrels 34 along barrel cam track 22 in a manner explained later.

The lower broken away portion of FIG. 1 shows star wheel having web 30 supporting aligned pairs of plate mounting rods 44, 45 which have bolted to their extremities pocket plates 46 having pockets 48 therein for receiving tubes T from feed turret 50 which is driven to rotate in a counterclockwise direction by suitable drive means (not shown).

Shown at the upper portion of FIG. 1 is one of a series of anvils generally designated 52 mounted at its opposite end through rotatable adjustable eccentric anvil bearings 54 within bearing housings 56 by stud shafts 58 within bearings of support bracket 62 and link 64, the former being secured directly to, and the latter secured indirectly through a support bracket 66 to, cross bars 67 of frame 12. Bearing housings 56 extend into arcuate flanges 68 having a backing pad 70 affixed to the bottom thereof.

FIG. 2 is an enlarged cross section showing the cutting means of this invention as taken substantially along line 2—2 of FIG. 1. Generally, FIG. 2 shows a tube T on a horizontally aligned and homed pair of mandrels 34, 34' whose plurality of spaced free-wheeling cutter wheels 74 are shown protruding through tube T as the tube is held between mandrel 34 and respective resilient backing pads 70 on arcuate flanges 68 of outer anvil bearings 56 of each anvil 52 having a rib 53 and being adjustably mounted on eccentric rotatable anvil bearings 54 mounted on stud shafts 58 rotatably mounted within links 64 separated by hollow spacers 76 and 78 on connecting rod 65 in turn mounted within connecting rod support bracket 66 affixed to cross bar 67. As shown in the fourth and sixth anvils from the left in FIG. 2, eccentric rotatable anvil bearings 54 within adjustable outer anvil bearings 56 have a circumferential V-shaped groove 80 for accepting the ends of set screws 82.

The lower portion of FIG. 2 shown broken away portions of barrel cam 20 whose helical track 22, at its axially innermost point, has simultaneously carried respective slide members 28 (left in FIG. 2, and closest to the reader in FIG. 1) and 28' over slide rods 32, 32' respectively affixed to front and rear turret plates 18, 26 of turret 16 (not shown). Slide members 28, 28' have extensions 36, 36' on which are affixed rod bearings 37, 37' within which slide members 28, 28' slide as they are cammed inwardly and outwardly by cam barrel tracks 22, 22'. When slide members 28, 28' have been cammed to their interiormost position, mandrels 34, 34' affixed to the upper portion of slide members 28 are thereby simultaneously cammed fully into tube T, the faces of mandrel noses 35, 35' meet adjacent the mid-point of the longitudinal axis of tube T and the male member on the face of mandrel 34 seats within the female pocket in the face of mandrel 34'. The mandrel noses are tapered to facilitate entry of the mandrels into tubes T adjacent the 6 o'clock position of main turret 16 when tubes T are accepted within the pockets of side plates 46, 46'.

As shown in the broken away portions of tube T, the upper portion of mandrels 34 facing backing pads 70 has a substantially U-shaped cut-out or groove 84, 84' within which are mounted cutter wheels 74 which have formed cut lines 86 in tube T and have thereby cut the tube into a plurality of can-sized segments T'.

FIG. 3 is an enlarged cross section taken through a tube T on a mandrel 34 having a substantially cylindrical cross sectional profile except for a flattened surface 88 along a longitudinal secantial plane substantially parallel to the mandrel axis. Mandrel 34 has a substantially U-shaped cutout or groove 84 cut radially into flattened surface 88. Groove 84 can run substantially the length of each mandrel 34, 34' or it can exist solely adjacent each respective, spaced cutter wheel 74. Groove 84 is shown having a substantially U-shaped block 90 mounted therein, a bottom cross section thereof being shown in FIG. 3. FIG. 3 also shows a side view of free-wheeling cutting wheels 74 rotatingly mounted on pin 92 in turn fixedly mounted within tines 94 of block 90. The upper cutting edge of cutter wheels 74 can be aligned with or beyond the circumference of mandrel 34, but preferably it is slightly inside of the mandrel circumference.

FIG. 4 is an enlarged cross section taken substantially along line 4—4 of FIG. 1. More particularly, FIG. 4 shows cutter wheel 74 having cut through distorted tube T to form segment T' as the upper circumferential edge of cutter wheel 72 passes within and against groove 71 of backing pad 70. Groove 71 can be tapered so that cutter wheel 74 gradually rather than abruptly effects its initial cut through tube T at the entrance end (left) in FIG. 1 of anvil 52.

FIG. 4 shows the cutting means of this invention including means for rotating tube T on mandrel 34. The drive means (not shown) drivingly rotates the main turret 16 and rotating turret 16 abuttingly passes tube T on mandrel 34 arcuately from the left to the right end of anvil 52 to thereby rotate the tube and cutter wheel 74 in a counterclockwise direction against backing pad 70. The pressure of mandrel 34 against pad 70 which conforms to and abuttingly engages longitudinal lengths of the exterior surface of tube T and causes the upper circumferential portion of tube T between flattened surface 88 and pad 70 to be flexed downwardly within the space created by flattened surface 88 to thereby expose cutter wheels 74 and permit a deep even and full cut through tube T. The downward flexing and distortion of tube T allowed by surface 88 during the aformentioned cutting action causes tube T to bow slightly outwardly into an elliptical form, and create a space between portions of the inner surface of tube T and the circumference of mandrel 34.

The inside-out tube cutting apparatus of this invention operates in the following manner: Looking at the lower portion of FIG. 1, full length tubes T are fed to apparatus 10 by means such as guide rails (not shown) and are picked up in feed turret pockets 51 of a counterclockwisely rotating feed turret 50 driven by suitable drive means (not shown) and having for example two pockets. At about the twelve o'clock position on the feed turret a tube T in feed turret pocket 51 is transferred to pocket 48 of side plate 46 on synchronously clockwisely rotating main turret 16 at which position the faces and noses 35, 35' of each mandrel of the cam actuated pair 34, 34' begins to enter the interior of and picks up or supports the ends of tube T. As main turret 16 rotates, the tube is moved upwardly around the left side of main turret 16 and gradually each mandrel of the pair is moved continuously inwardly interiorly of the tube until they meet at the longitudinal axial midpoint of the tube at about eleven o'clock on turret 16. Adjacent that point, the tube abuttingly engages the series of spaced, adjacent, aligned, fixed backing pads 70 which action causes the passing tube to rotate in a counterclockwise direction, distorts it and forces it against the corresponding series of spaced, vertical free-wheeling cutters 74 eccentrically pin-mounted within grooves 84, 84' of mandrels 34, 34'. This action cuts the tube T into a plurality of can-sized segments T'. The tube should be made to rotate a suitable number of times to assure a full circumferential cut. It has been found that for imparting a gradual initial cut one and a quarter turns is satisfactory. At about the 2 o'clock position on main turret 16, mandrels 34, 34' start being cam-withdrawn from the longitudinal axial midpoint of tube segments T', and, as they are, the interiormost segments, i.e., those most adjacent noses 35, 35', no longer supported by the respective mandrels, are released, picked up and discharged from turret 16 by means such as guide rails 72. As mandrels 34, 34' are further cam withdrawn, each mandrel respectively successively simultaneously releases an adjacent can-sized segment to the left and right of those previously released, each of which is discharged by more widely spaced respective guide rails such as 73 (and others positioned lower on frame 12 but not shown) until all of segments and any scrap tubing such as rim portions at either end of tube T are discharged.

With respect to the improved cutting means of this invention, each of the plurality of free-wheeling cutter wheels 74 are of smaller circumference than and are mounted eccentrically within respective mandrels 34, 34' so that the axis of each cutter wheel is parallel and eccentric to that of its mandrel and so that each cutter wheel has its circumferential cutting edge preferably inside the circumference of mandrel 34. This facilitates initial loading of tubes T on the mandrels. Flattened surface 88 exposes tubes T to cutter wheels 74 even though they are inside the circumference of the mandrel. Pins 92 on which cutter wheels 74 are rotatedly mounted can be mounted directly within the walls of groove 84 of mandrel 34, but preferably they are rotatably mounted within tines 94 of block 90 or a similar structure. Cutter wheels 74 can be made of any suitable hard material such as hardened carbide steel, the material selected as well as its dimensions and profile varying depending on the hardness and other characteristics of the materials of which tube T is comprised. Such a steel would be preferred should the tubes be made of a metal, e.g., thin aluminum stock. The diameter of mandrel 34 can be any suitable diameter, and preferably they are are as solid as possible, to prevent bowing thereof during the cutting operation. The number of cutter wheels can vary and can be of any suitable number depending on the number of cut segments desired. A plurality of cutter wheels can be aligned with a single anvil.

Groove 84 in the outer surface of mandel 34, 34' can be of any suitable configuration or dimension. For example, the groove could be of sufficient dimension only to accomodate each respective cutter wheel 74 or each respective U-shaped block 90. Preferably, groove 84 extends a sufficient longitudinal distance to facilitate replacement or repair of respective wheels 74 and, most preferably, it extends the length of mandrel 34.

The backing means of the improved cutting means of this invention can be any suitable backing which abuttingly engages the exterior surface of tubes brought to pass abuttingly thereagainst and which drives or forces the tubes to rotate against the cutter wheels to thereby cut the tubes into a plurality of tubular segments. The backing means can be made of a metal, for example steel, but preferably it is made of a resilient material such as neoprene. The backing means preferably includes a plurality of individual backing members each aligned with and preferably each perpendicularly adjustable in relation to the cutting surface of cutter wheels 74 and in relation to each mandrel axis so that, as desired, more or less pressure can be applied to the tubes against the cutter wheels. The backing means can be adjusted in any suitable manner. It has been found advantageous to adjust the pressure of anvils 52 by conventional means such as by loosening set screw 82, inserting a key within the holes of eccentric rotatable anvil bearings 54, rotating the bearings as desired and setting screw 82 into groove 84 to secure the setting. This adjustable feature is advantageous because when for example mandrels 34, 34' are quite long, any bowing, for example adjacent their noses 35, 35' and any consequent loss of pressured engagement of cutter wheels 74 with backing pad 70 can be compensated for by lowering respective anvil 52 as explained. Pressure exerted by the backing member can be varied either or both at the forward entering end of anvil 52 (left in FIG. 1) and at the rear exit end (right in FIG. 1) by adjusting eccentric rotatable anvil bearings 54 in the aforementioned manner. The particular length of anvil 52 may be any suitable length to provide a suitable number of tube rotations which will assure a full, complete, joined cut around the entire circumference of tube T.

It is thought that the invention and many of its attendant advantages will be understood from the aforegoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Improved cutting means for an inside-out tube cutting apparatus of the type including a mandrel for carrying the tube; cutting means for cutting the tube from the inside-out into a plurality of tubular segments; means for moving the tubes into working relationship with the cutting means, and means for discharging the tubular segments, the improvement which comprises:
    a flattened surface on the mandrel along a longitudinal secantial plane substantially parallel to the mandrel axis:
    a plurality of free-wheeling cutter wheels of smaller circumference than and mounted in the mandrel so that the axis of each cutter wheel is parallel and eccentric to that of the mandrel, and so that each cutter wheel has its circumferential cutting edge inside the circumference of the mandrel but exposed to the tube by the flattened mandrel surface; and backing means abuttingly engaging the exterior surface of the tube during its working relationship with the cutter wheels to distort the tube as allowed by the flattened mandrel surface and to force it to rotate against the cutter wheels to thereby cut it into a plurality of tubular segments.

2. The improved cutting means of claim 1 wherein the mandrel has a groove in its flattened surface and each cutter wheel is mounted therein.

3. The improved cutting means of claim 2 wherein substantially U-shaped blocks are mounted in the groove and each cutter wheel is pin-mounted in the tines of one of the blocks.

4. The improved cutting means of claim 1 wherein the backing means includes a plurality of individual backing members respectively aligned with and perpendicularly adjustable in relation to the axis of the respective cutter wheels to apply variable pressure on the tube against the cutter wheels.

5. Improved cutting means for an inside-out tube cutting apparatus of the type including a mandrel for carrying the tube; cutting means for cutting the tube from the inside-out into a plurality of tubular segments; means for moving the tubes into working relationship with the cutting means, and means for discharging the tubular segments, the improvement which comprises:

a plurality of free-wheeling cutter wheels of smaller circumference than and mounted in the mandrel so that the axis of each cutter wheel is parallel and eccentric to that of the mandrel and so that each cutter wheel has its circumferential cutting edge inside the circumference of the mandrel but exposed to the tube;

backing means conforming to and abuttingly engaging longitudinal lengths of the exterior surface of the tube during its working relationship with the cutter wheels to distort the tube to rotate against the cutter wheels to thereby cut it into a plurality of tubular segments.

6. The improved cutting means of claim 5 wherein the mandrel has a flattened surface along a lontitudinal secantial plane substantially parallel to the mandrel axis and facing the backing means and to allow the tube to partially distort toward the surface as the backing means force the tube against the cutter wheels to thereby cut it into a plurality of tubular segments.

7. Improved cutting means for an inside-out tube cutting apparatus of the type including means for feeding a tube to a turret, a pair of oppositely reciprocal, horizontally aligned mandrels on the turret, cutting means on the mandrel for cutting the tube from the inside out into a plurality of tubular segments, means for horizontally camming each mandrel of the pair into opposite ends of the tube so that the innermost faces at the ends of the mandrels engage at the longitudinal mid-point of the tube during the cutting operation, means for imparting rotational motion between the tube and the cutting means during the cutting operation, and means for discharging the tubular segments from the turret, the improvement which comprises:

a flattened surface on the mandrel along a longitudinal secantial plane substantially parallel to the mandrel axis, a longitudinal groove in the flattened surface of the mandrel which runs parallel to the mandrel axis, a plurality of substantially U-shaped blocks mounted in the groove, a plurality of free-wheeling cutter wheels of smaller circumference than the mandrel pin-mounted in the tines of the U-shaped block so that the axis of each cutter wheel is parallel and eccentric to that of the mandrel and each cutter wheel has its circumferential cutting edge inside the circumference of the mandrel but exposed to the tube by the flattened mandrel surface, and backing means including a plurality of individual backing members respectively aligned with the cutter wheels and perpendicularly adjustable in relation to the axis of the respective cutter wheels and adapted to abuttingly engage and apply variable pressure to the exterior surface of the tube to rotate the tube on the mandrel and force it against the cutting wheels to cut the tube into a plurality of tubular segments.

* * * * *